United States Patent
Clabaugh et al.

(10) Patent No.: US 6,493,433 B2
(45) Date of Patent: Dec. 10, 2002

(54) MULTI-THREADED DATABASE SYSTEM FOR AN INTERACTIVE VOICE RESPONSE PLATFORM

(75) Inventors: Lonnie S. Clabaugh, Cedar Rapids, IA (US); Kolin G. Hogue, Kalona, IA (US); Gregory J. Kelsey, Cedar Rapids, IA (US); Shailesh Patwardhan, Mumbia (IN)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/144,710

(22) Filed: Sep. 1, 1998

(65) Prior Publication Data

US 2002/0057770 A1 May 16, 2002

Related U.S. Application Data

(60) Provisional application No. 60/091,874, filed on Jul. 7, 1998.

(51) Int. Cl.[7] .......................... H04M 1/64; H04M 1/24; H04M 3/42
(52) U.S. Cl. .............. 379/88.13; 379/67.1; 379/15.03; 379/88.04; 379/88.22; 379/201.03; 379/201.12
(58) Field of Search .......................... 379/2, 34, 88.02, 379/88.11, 88.13, 88.14, 88.22, 88.23, 88.25, 88.26, 88.27, 93.02, 93.12, 93.29, 100.05, 126, 133, 157, 201, 203, 220, 223, 243, 279, 671, 76, 83, 88.04, 88.12, 88.17, 88.18, 88.24, 9.05, 15.02, 15.03, 15.04, 201.01, 201.02, 201.03, 201.12, 220.01, 221.03

(56) References Cited

U.S. PATENT DOCUMENTS

| | | | | |
|---|---|---|---|---|
| 5,450,480 | A | * 9/1995 | Man et al. | 379/201 |
| 5,583,920 | A | * 12/1996 | Wheeler, Jr. | 379/88 |
| 5,835,908 | A | * 11/1998 | Bennett et al. | 707/10 |
| 5,881,131 | A | * 3/1999 | Farris et al. | 379/27 |
| 5,881,135 | A | * 3/1999 | Watts et al. | 379/88.02 |
| 5,883,946 | A | * 3/1999 | Beck et al. | 379/201 |
| 5,915,008 | A | * 6/1999 | Dulman | 379/201 |
| 5,937,048 | A | * 8/1999 | Pelle | 379/201 |
| 5,953,389 | A | * 9/1999 | Pruett et al. | 379/9 |
| 6,041,325 | A | * 3/2000 | Shah et al. | 707/10 |

* cited by examiner

Primary Examiner—Allan Hoosain

(57) ABSTRACT

The multi-threaded database system manages access to a plurality of databases. A separate thread is assigned to each of the databases so as to encapsulate activities relative to the databases. Threads may be performing separate activities independently of each other. As a result, a first database may be modified, added, or deleted while a second database is being accessed. The database system is especially well-adapted for use with an interactive voice response platform.

22 Claims, 13 Drawing Sheets

MULTI-THREADED DATABASE SYSTEM FOR AN INTERACTIVE VOICE RESPONSE PLATFORM

This application claims benefit of U.S. Provisional Application No. 60/091,874 filed Jul. 7, 1998.

TECHNICAL FIELD

The present invention relates generally to telecommunications systems and more particularly to a multi-threaded database system for an interactive voice response platform.

BACKGROUND OF THE INVENTION

In telecommunications systems, specialized computers known as interactive voice response (IVR) platforms or voice response units (VRUs) provide IVR services. The IVR platforms typically use pre-recorded voice messages to convey information to callers and collects data entered by callers from remote touch tone key pads. In addition, the IVR platforms can communicate with switches and other devices to provide desired functionality. The IVR platforms run special IVR application programs to guide call processing (i.e., the handling of the call). The application programs as well as data used by the IVR platforms may be stored in a database. Given that the IVR platform performs call processing in real time, it is critical that database transactions are performed quickly. In addition, since a single IVR platform typically supports IVR services for thousands of customers, thousands of different databases may be required. Unfortunately, conventional systems have difficulty in providing quick database access and also do not support thousands of databases. Another drawback to conventional systems is that updates to a database often interrupt current call processing.

SUMMARY OF THE INVENTION

The present invention addresses the limitations of conventional IVR platforms by providing a multi-threaded database system for IVR platforms. The database system is able to support thousands of different databases simultaneously. Each database may be assigned a different thread that is responsible for interacting with the database. The database system is configured so as to permit updates to the databases and replacement of selected databases without affecting current call processing. Moreover, the database management system is configured so as to provide fast access to the databases to support real time call processing by the IVR platform.

In accordance with one aspect of the present invention a method is practiced in a telecommunications system that includes an interactive voice response (IVR) platform for providing IVR services. A database system is provided for use by the IVR platform. The database system includes multiple databases and a separate thread may be assigned to each of the databases to perform operations on the databases. The first of the threads is used to access the first of the databases to perform call processing. The second of the databases is modified or a new database is added to the database system without interrupting the processing of the call by the first thread.

In accordance with another aspect of the present invention, the database system includes a plurality of databases that hold information for use by an IVR platform. The databases are logically grouped into subsets. The database system includes an interface to the IVR platform to facilitate communications between the database system and the IVR platform. A separate thread is associated with each of the databases to perform operations on the associated database. A separate thread is provided for each of the subsets of the databases for communicating with the thread and the IVR platform via the interface.

In accordance with a further aspect of the present invention, a telecommunications network includes an IVR platform for providing IVR services to callers. The telecommunications network also includes a database system for the IVR platform. The database system includes a plurality of databases holding application's data for use by the IVR platform. The database system also includes a database management system for managing access to the databases. A separate thread is provided for each database to perform operations on the database.

BRIEF DESCRIPTION OF THE DRAWINGS

An illustrative embodiment of the present invention will be described below relative the following drawings.

DETAILED DESCRIPTION OF THE INVENTION

The illustrative embodiment of the present invention provides a database system that is multi-threaded. The database system concurrently manages a large number of databases (e.g. thousands of databases). A separate thread is provided for each database to manage access to the database. The use of multiple threads in a per database arrangement helps to encapsulate activities such that the activity performed by one thread is independent of the activity performed by another thread. Thus, one database may be modified, deleted or replaced while call processing continues on another thread.

The database system of the illustrative embodiment of the present invention is scalable. The database system may include a single database or may, instead, include thousands of databases. In addition, the database system facilities are configured to operate quickly. The database system supports very fast queries to enable call processing in real time.

In order to clarify the discussion below, it is helpful to define a few terms.

A "thread" refers to a separate path of execution or process that is part of a larger process.

"Multi-threaded" refers to a system that concurrently executes multiple threads.

"IVR services" refer to voice services provided by a voice response unit (VRU) or other IVR platform. These services include playing pre-recorded voice messages to callers and the collecting of dual tone multiple frequency (DTMF) digits.

A "telecommunications system" refers to a network or other system over which telecommunications travel. Telecommunication systems may include telephone networks and computer networks.

A "database" refers to an aggregation of data, including a file that includes records or tables.

Figure 1:
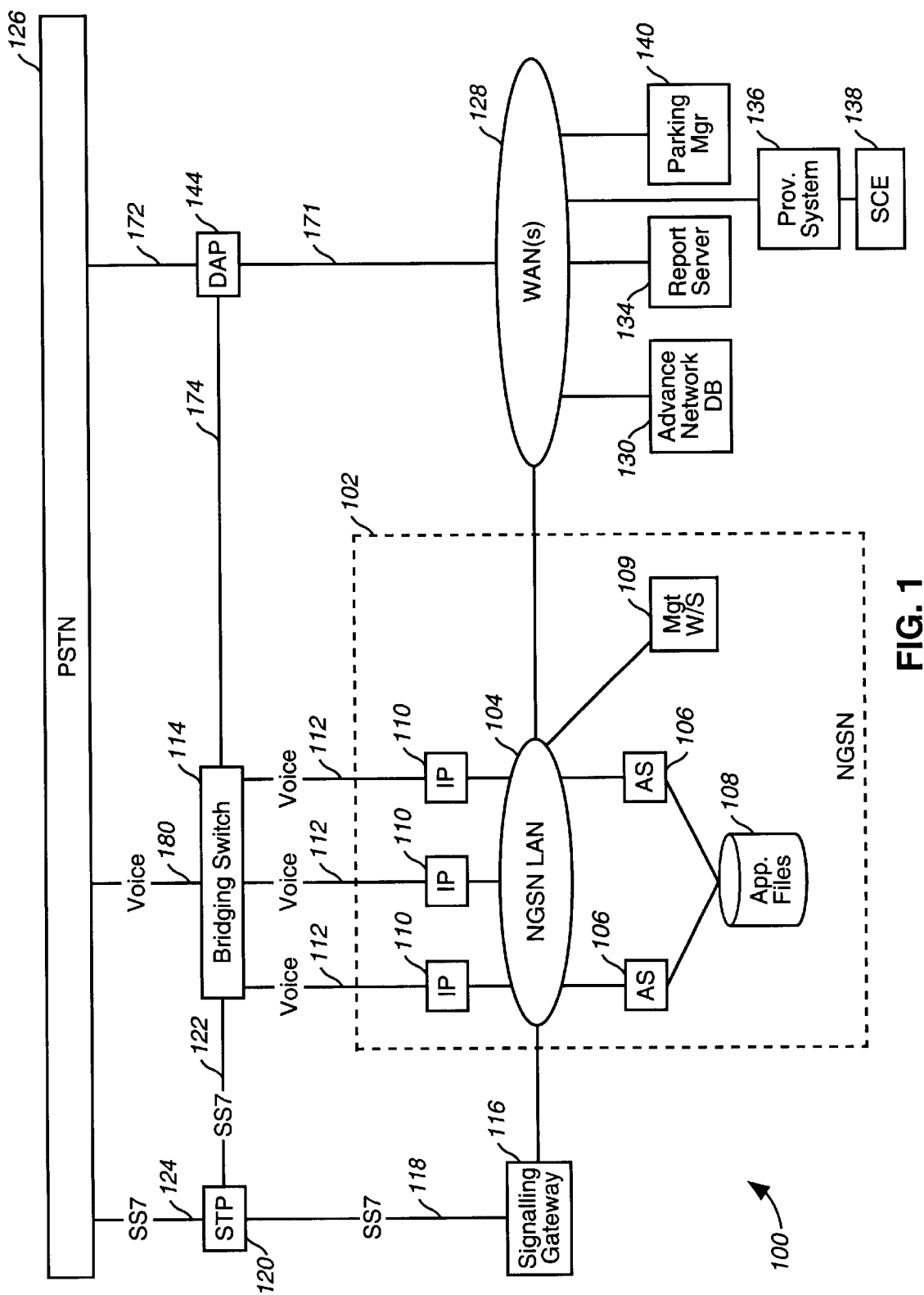
FIG. 1 is a block diagram that depicts a telecommunications network that is suitable for practicing the illustrative embodiment of the present invention.

FIG. 1 depicts a telecommunications system 100 that is suitable for practicing the illustrative embodiment of the present invention. The telecommunications network 100 is used to carry communications, including both voice and data. Telecommunications network 100 includes a next generation service node (NGSN) 102. The NGSN 102 is an IVR platform that provides IVR services. The NGSN 102 is a voice response unit (VRU). These services may be configured by applications and scripts. These services may include issuing commands, playing pre-recorded voice messages and collecting DTMF digits. The NGSN 102 includes a local area network (LAN) 104 for interconnecting various components of the NGSN. The LAN 104 may be implemented, for example, as an Ethernet network or an FDDI network. Application servers (AS) 106 are connected to the LAN 104 for running applications programs that facilitate operation of the NGSN 102. These application servers 106 may be implemented as server computer systems, such as servers that employ the Alpha microprocessor from Digital Equipment Corporation. The application servers 106 have access to application files 108 that are stored on a secondary storage medium, such as a magnetic disk drive, optical disk drive or other secondary storage device. The application files 108 facilitate the IVR services that are provided by the NGSN 102.

A management workstation 109 is connected to the LAN 104. The management workstation 109 collects and stores alarms that are generated by the application servers 106 and the intelligent peripherals (IP) 110. The alarms identify problems in the telecommunications network 100. A user interface is provided on the management workstation 109 to provide visual information about the alarms. The management workstation 109 is also responsible for forwarding alarms to a wide area network (WAN) 128. The management workstation 109 may be implemented using any of a number of different varieties of computerized workstations.

The intelligent peripherals 110 receive calls from a public-switched telephone network (PSTN) 126. The intelligent peripherals 110 also provide voice responses to callers and collect input from callers via DTMF signals or voice recognition. Different types of computer devices may be used to implement the intelligent peripherals 110. For instance, the Alpha voice 1000 computer from Digital Equipment Corporation may be utilized to implement the intelligent peripherals 110. In general, the intelligent peripherals 110 are computer systems that include telephony ports.

As is shown in FIG. 1, the intelligent peripherals 110 are connected via voice trunks to a bridging switch 114.

The bridging switch 114 is connected to the PSTN 126 via voice trunks 180, such as T1 voice trunks. A suitable device for the bridging switch 114 is a Northern Telecom DMS-250 digital matrix switch that supports release link trunk (RLT) voice connections to the NGSN 102. Incoming calls are passed from the PSTN 126 over the voice trunk 180 to the bridging switch 114. The bridging switch 114 then passes the call to one of the intelligent peripherals 110. The intelligent peripherals 110 direct the processing of calls, and communicate with the application servers 106 to provide IVR services. The application servers 106 store data required by the intelligent peripherals 110 to support call processing. In addition, the application servers 106 provide an interface to local and external databases for the intelligent peripherals 110.

The telecommunications network 100 may include a signal transfer point (STP) 120 for transferring signaling messages to and from the NGSN 102. A signaling gateway 116 translates between the signaling system used in the PSTN 126 and a proprietary signaling protocol that is used in the NGSN 102. The signaling gateway 116 may also perform resource management and call state management for the NGSN 102. The signaling gateway 116 is connected to the STP 120 via link 118, which uses signaling system 7 (SS7) signaling. The STP 120 is connected to the PSTN 126 via link 124. The STP 120 is also interfaced with the bridging switch 114 via link 122.

As mentioned above, the NGSN 102 is connected to a WAN 128. The WAN 128 may be implemented using a variety of different types of networks including Ethernet networks, channel banks, routers, T-1, T-3 and frame relay links, and others. The WAN 128 allows multiple NGSN 102 platforms to be used within the telecommunications network 100. Only one NGSN 102 is shown in FIG. 1 for the purposes of simplicity. An advanced network database (NDB) 130 is connected to the WAN 128. The NDB 130 is a database system implemented on the computer that provides the NGSN 102 with data regarding customers and the telecommunications network 100.

A report server 134 may also be connected to the WAN 128. The report server 134 is a server computer system that is programmed to generate reports regarding application performance results and call events. The report server 134 collects call event information that is generated throughout a call and summarizes the event information in a report comprising call statistics.

A provisioning system 136 is connected to the WAN 128. The provisioning system 136 is used to provision the NGSN 102 with IVR application programs and data. The provisioning system 136 downloads new data and data updates to each NGSN 102 via the WAN 128. New data and modified data are provided by the provisioning system 136 to update the databases that are managed by the database system.

The service creation environment (SCE) 138 is a computer-based platform and graphical user interface (GUI) that allows users to create, modify and manage application programs. The SCE 138 communicates with the provisioning system 136 to create, modify or manage the data and application programs used by the NGSN 102.

A parking manager 140 is connected to the WAN 128. The parking manager 140 manages call parking resources within the telecommunications network 100. The parking resources include ports and applications of the NGSN 102. The parking manager 140 tracks availability of terminations of call transferred from each of the NGSNs within the telecommunication network 100. The parking manager 140 uses the WAN 128 to communicate with each of the respective NGSNs.

A data access point (DAP) 144 is connected to the WAN 128, the PSTN 126 and the bridging switch 114 via links 171, 172 and 174, respectively. The DAP 144 can be realized as a computer system or as a specialized switch to perform a variety of calls with the telecommunications network 100. The DAP 144 performs routing for special service calls, such as 800 and 888 calls and virtual private network calls. The DAP 144 may also be used for performing routing translations of calls that are transferred from the NGSN 102. When an application that is running on one of the application servers 106 determines that a call needs to be extended to the network, the NGSN 102 sends a routing query to the DAP 122. The DAP 122 responds to the query with the network address for routing the call. Those skilled in the art will appreciate that the telecommunications network 100 may include multiple DAPs.

The internal architecture of the NGSN 102 is described in further detail in co-pending application entitled "Advanced Interactive Voice Response Service Node," which was filed on May 7, 1998 and has been assigned application Ser. No. 09/073,880. This co-pending application is explicitly incorporated by reference herein. Additional features of the NGSN 102 are described in detail in co-pending application entitled "System for Executing Advanced Interactive Voice Response Services Using Service-Independent Building Blocks," which was filed on May 7, 1998 and which has been assigned application Ser. No. 09/037,887; "Interactive Voice Response Service Node with Advanced Resource Management," which was filed on May 7, 1998 and which has been assigned application Ser. No. 09/074,142, all of which are explicitly incorporated by reference herein.

The signaling gateway 116 is described in more detail in co-pending application entitled "Communication Signaling Gateway and System for an Advanced Service Node," which was filed on May 7, 1998 and which has been assigned application Ser. No. 09/074,072; and "Call and Circuit State Machine for a Transaction Control Layer of a Communications Signaling Gateway," which was filed on May 7, 1998 and which has been assigned application Ser. No. 09/073,885, all of which are explicitly incorporated by reference herein. The provisioning system 136 is described in more detail in co-pending application entitled "A Service Provisioning System for Interactive Voice Response Services," which was filed on May 7, 1998 and which has been assigned application Ser. No. 09/074,050, which is explicitly incorporated by reference herein.

Those skilled in the art will appreciate that the telecommunications network 100 depicted in FIG. 1 is intended to be merely illustrative and not limiting of the present invention. Not all of the components depicted in FIG. 1 need to be included as part of the telecommunication network. Moreover, additional components may be included in the telecommunications network. Further, the NGSN need not include multiple peripherals and need not include multiple application servers. Still further, the management workstation of the NGSN is an optional component that need not be included in practicing the present invention.

The database system of the illustrative embodiment may be installed on the application servers 106. Each of the databases may be associated with respective customers, and these databases may dictate how calls are processed by the NGSN 102 for the respective customers. For example, one database may include information for a first customer that desires to present callers with a voice menu of options. A second database may include messages for a second customer that provide information to the customer but does not provide a voice menu.

Figure 2:
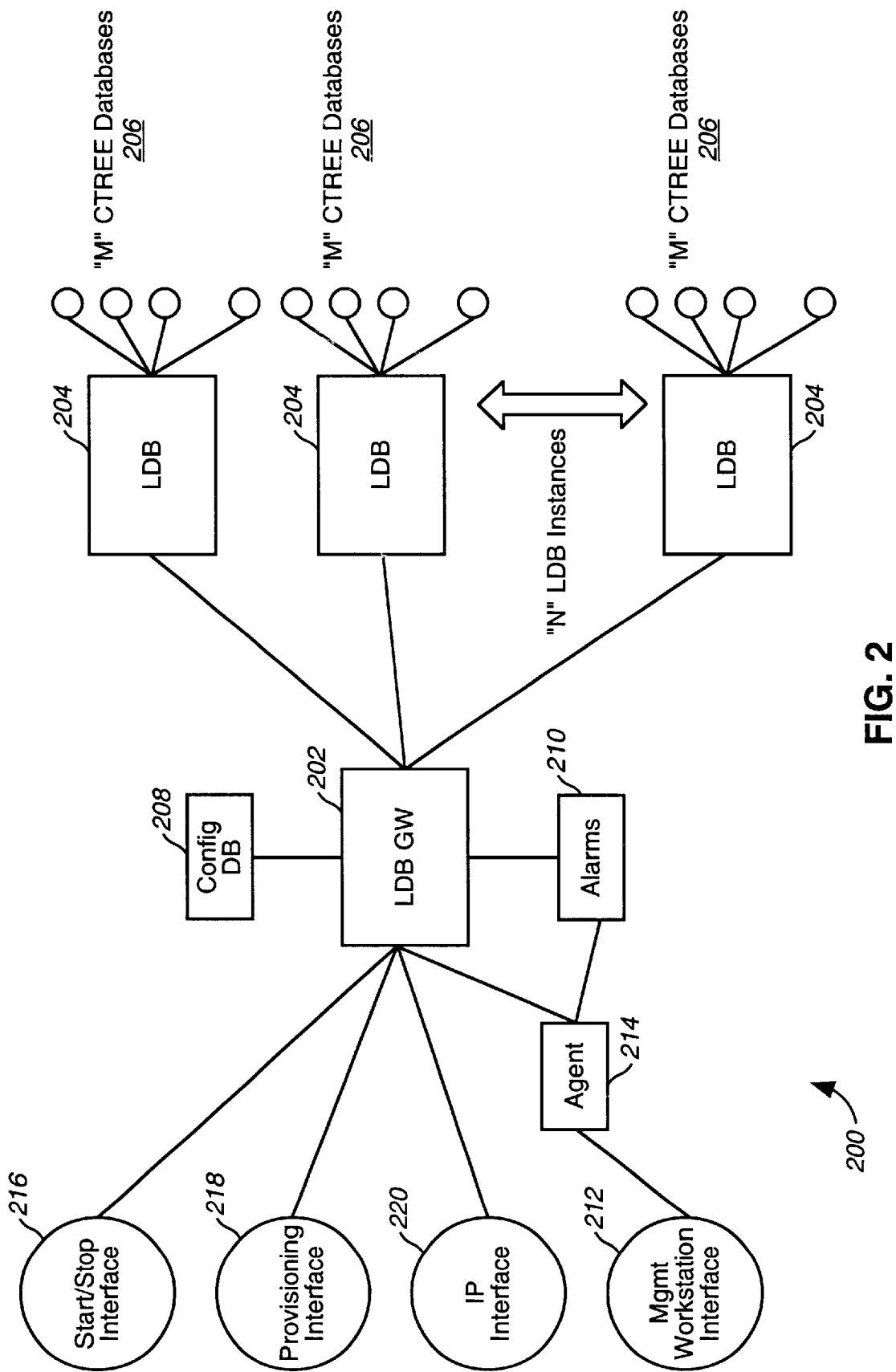
FIG. 2 is a block diagram that illustrates the local database (LDB) system of the illustrative embodiment of the present invention.

FIG. 2 depicts the database system 200 that is used to practice the illustrative embodiment of the present invention. A local database gateway (LDB GW) 202 is provided to manage access to the local databases (LDBs) 204. The LDB GW 202 provides an interface with external clients and routes database requests to the appropriate LDB instance 204. Each LDB instance 204 is a process that supports individual databases services. Each LDB instance 204 receives requests from the LDB GW 202, services the requests and sends responses back to the LDB GW. Because The LDB GW 202 communicates with many LDB instance 204 processes, it allows the system to scale upward to support an extremely large number of databases. Those skilled in the art will appreciate that in an alternate embodiment, there is no need for employing the LDB GW. Instead, each LDB instance 204 is responsible for receiving and processing requests.

Each LDB instance 204 is responsible for managing access to a subset of databases 206. The illustrative embodiment assumes that the databases are C-TREE databases from FAIRCOM Corporation of Columbia, Mo. It is further assumed that the related C-TREE libraries are available to the application servers 106. The organization of the LDB instances 204 and the LDB GW 202 will be described in more detail below.

The LDB GW 202 has an interface 218 with the provisioning system 126. The provisioning system informs the NSGN 102 of changes that have been made to the databases 206. The LDB GW 202 also includes an interface 216 for receiving a start message and a stop message that are provided as part of the database system. The start message is passed at start up time to direct the LDB GW 202 to perform initial operations. The stop message is used to stop operation of the LDB GW 202 and to perform cleanup. The LDB GW 202 also includes an interface 220 through which data requests are received and through which responses are sent. Such requests may originate from and the responses may be destined to the intelligent peripherals 110 or other devices within the telecommunications network 100. The LDB GW 202 may include an interface to the management workstation 109, allowing the management workstation 109 to start, stop, and monitor the LDB GW 202.

During operation of the database system, various problems may arise that generate alarms 210. An agent 214 of the management workstation 109 views the alarms 210 and passes the alarms to the management workstation 212. The management workstation 109 may display the alarms 210 or, more generally, may call the alarm to the attention of the user of the management workstation 109. The management workstation 109 may be programmed to generate responses to the alarms 210.

The LDB GW 202 includes access to a configuration database 208. The configuration database 208 stores configuration information (such as what databases are installed) that is necessary for the database system to run properly.

Figure 3:
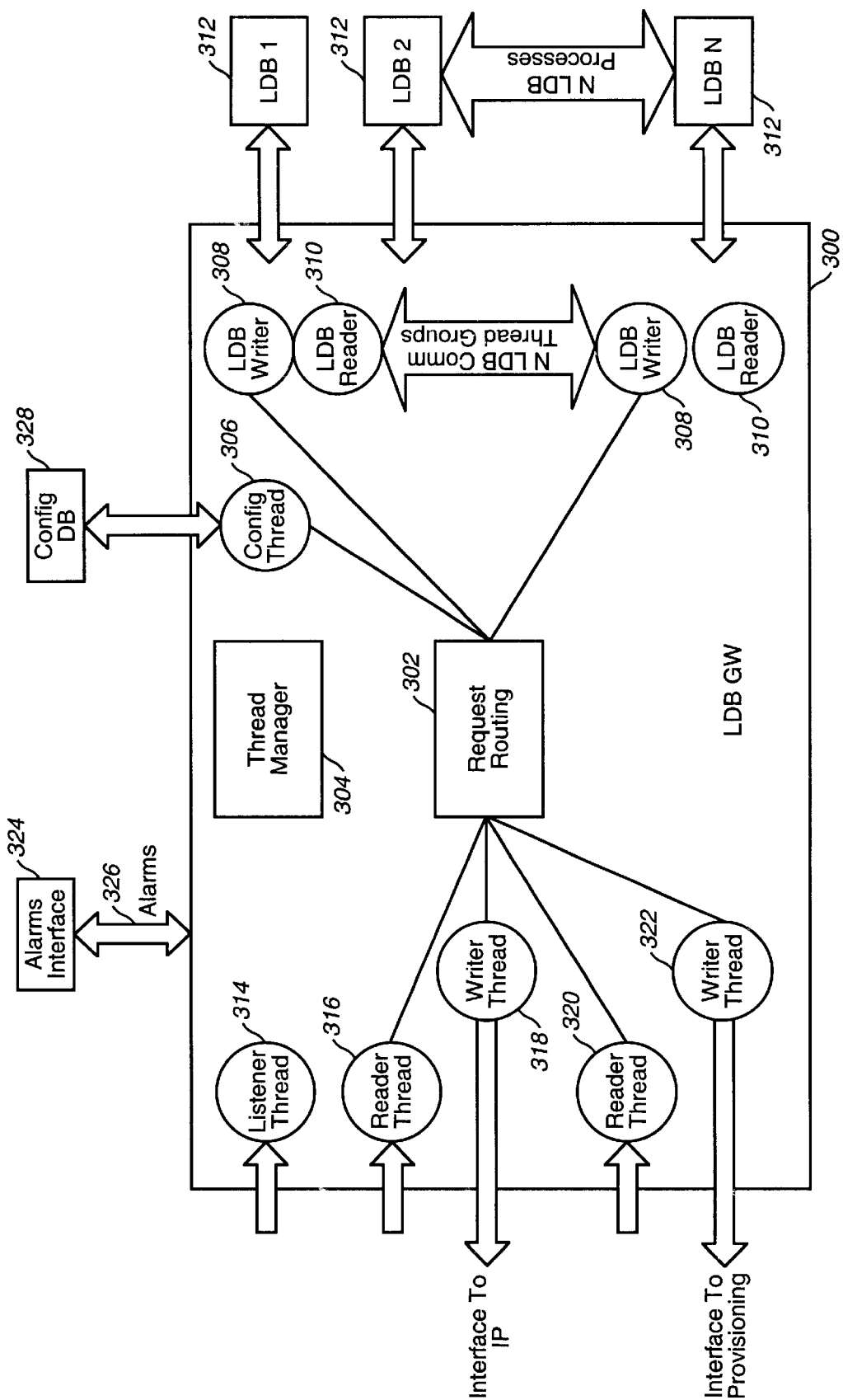
FIG. 3 depicts the logical organization of the LDB gateway (GW) of FIG. 2 in more detail.

FIG. 3 depicts the logical organization of the LDB GW 300 in more detail. In this figure, the management workstation interface 212, and the start/stop interface 216 are not shown. The LDB GW 300 includes a component 302 comprising routing logic for routing requests to appropriate LDB instances 312. Customers communicate with the database by sending messages (i.e., requests) that request information from databases. Component 302 determines which LDB should receive the requests and routes the request accordingly. This component 302 also routes the responses back toward their originators.

As was mentioned above, the database system of the illustrative embodiment is multi-threaded. To that end, a thread manager 304 is provided to start and stop individual threads. As new services are started, the thread manager 304 is called upon to start the threads for the services. In the illustrative embodiment of the present invention, the database system is implemented in an object-oriented environment. As such, the thread manager is implemented as an object of the thread manager object class. The thread manager object class supports a number of methods. These methods include a startService method that starts a service of a given type. The stopService( ) method stops a service of a given type.

The LDB GW 300 shown in FIG. 3 includes a configuration thread 306 that has access to configuration database 328. The configuration database 328 holds information regarding what services (i.e. databases) need to be made active. This configuration database 328 is accessed during startup in order to determine which services to start. As changes are made via the provisioning system 136 during operation of the database system, the configuration database 328 changes to keep the configuration information current. For example, as databases 206 are added and deleted, the configuration database 328 is updated via the configuration thread 306 to reflect the changes of the databases.

The LDB GW 300 communicates with each LDB instance 312 via LDB writer threads 308 and LDB reader threads 310. There is one LDB writer thread 308 and one LDB reader thread 310 for each LDB instance 312.

A listener thread 314 is provided to listen for connection requests from external clients (i.e. the clients running on the Intelligent Peripherals 110). A reader thread 320 is provided for reading requests from the provisioning system 136. Similarly, a writer thread 322 writes response messages to the provisioning system 136. A reader thread 316 reads requests from the intelligent peripherals 110, and a writer thread 318 writes response messages to the intelligent peripherals.

The LDB GW 300 includes an alarms interface 324. Alarms 326 are written and read from an alarms file that is accessible via the alarm interface 324, and the alarms are subsequently sent to the Management Workstation 212 by a separate process.

Figure 4:
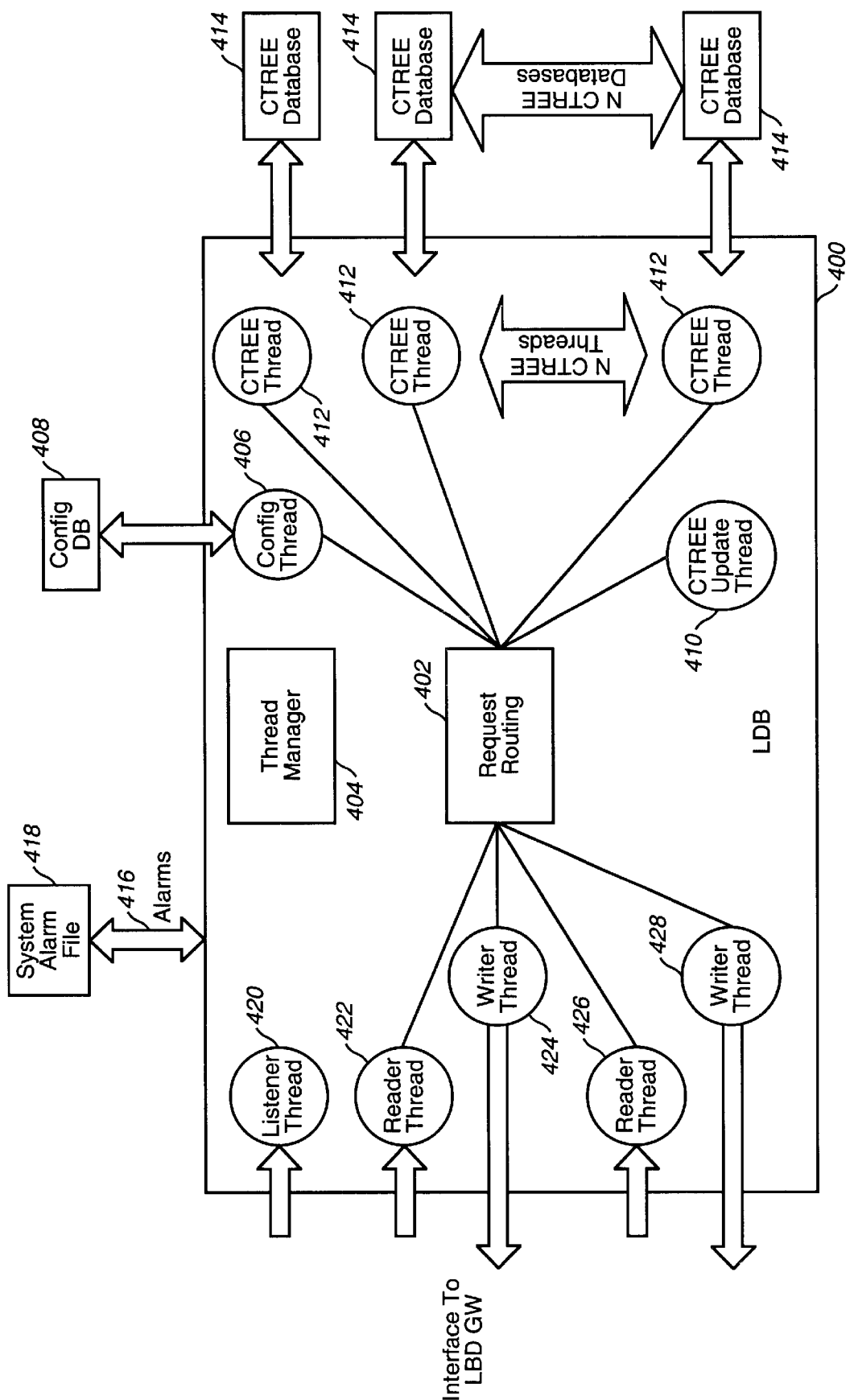
FIG. 4 depicts the logical organization of an LDB instance in more detail.

FIG. 4 depicts the logical organization of an LDB instance 400. The LDB instance 400 includes logic 402 for performing request routing. Specifically, this logic 402 routes requests that are received from the LDB GW to the appropriate C-TREE databases 414. Each C-TREE database 414 has an associated C-TREE thread 412 that manages access to the associated C-TREE database. As can be seen in FIG. 4, any number of C-TREE databases may be associated with a particular LDB instance 400. In the example depicted in FIG. 4, there are N C-TREE databases and N C-TREE threads 412.

The thread manager 404 creates, destroys, starts and stops threads as needed by the LDB instance 400. A listener thread 420 listens for connections requests from the LDB GW. A reader thread 422 and writer thread 424 are provided for reading and writing requests relative to the LDB GW.

Figure 5:
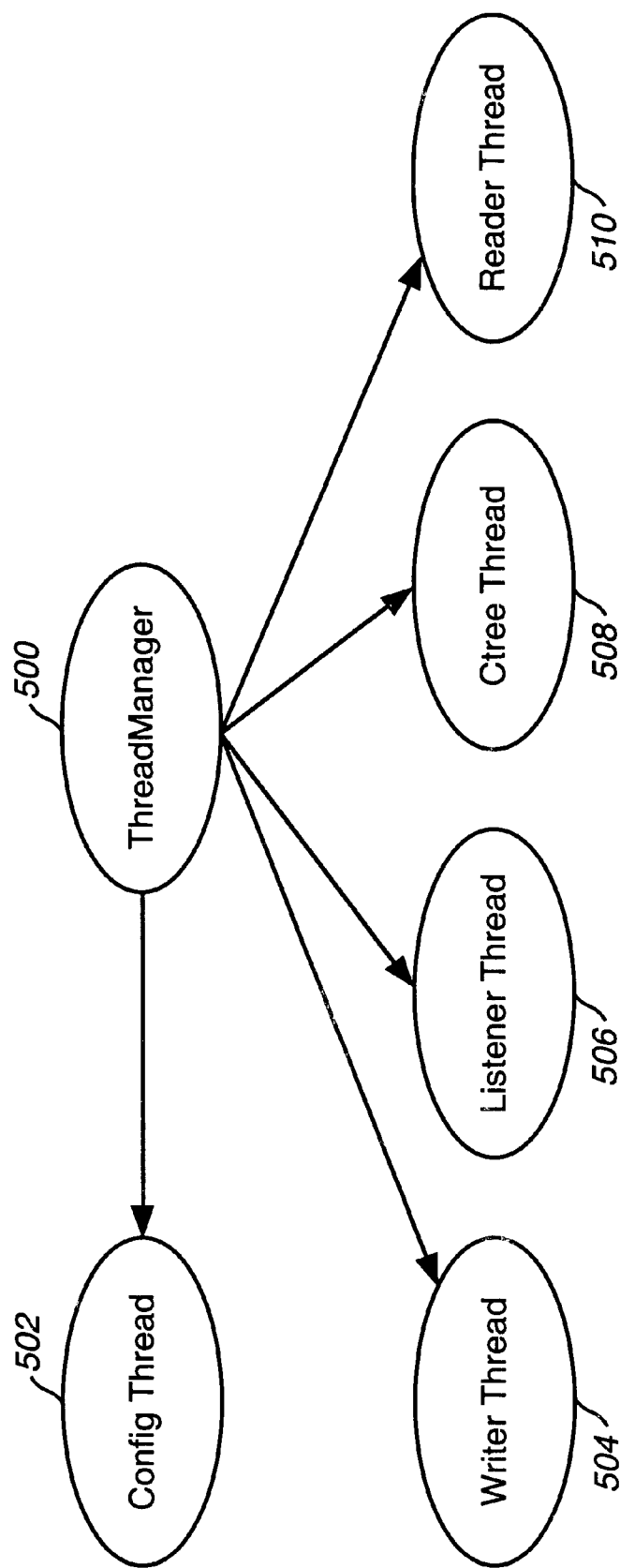
FIG. 5 illustrates the objects used in the threading model of the illustrative embodiment.

FIG. 5 shows a diagram illustrating the relationships between objects used with the threading model of the illustrative embodiment of the present invention. There is only a single instance of the thread manager 500 for each process (either the LDB GW 202 or an LDB instance 206). The thread manager 500 manages two types of threads: service threads and base threads. A base thread implements a thread that can be started or stopped by the thread manager. A service thread extends the functionality of a base thread to incorporate a queue that is serviced by the thread. Base threads and services threads are implemented as object classes. The base thread object class includes start ( ) and stop( ) methods for starting and stopping threads. A threadInit( ) method is supported by this object class to perform thread initialization. The service thread object class includes a getMessage( ) method that reads a message from the queue associated with the class and a sendMessage( ) method that sends a message to a destination service thread objects queue.

FIG. 5 depicts the relationship among the threads used in the present invention. The thread manager 500 manages writer threads 504, listener threads 506, C-TREE threads 508 and reader threads 510. Reader threads 510, writer threads 504 and listener threads 506 together form the external interfaces for the LDB GW 202 and LDB instances 204. There may be many of these threads in the system to support the desired number and type of interfaces. Each writer thread 504 writes response messages back to the originators of the request messages. Each listener thread 506 listens for connections requests from external clients (originators). Each reader thread 510 reads requests and delivers the requests to the request routing component (302, 402) depending on which type of process is relevant. The Config thread 502 interfaces with the configuration database (328, 408), and also directs the thread manager 500 to start and stop C-TREE threads 508 as required. Each C-TREE thread 508 is responsible for managing access to respective C-TREE databases (206, 414).

Figure 6:
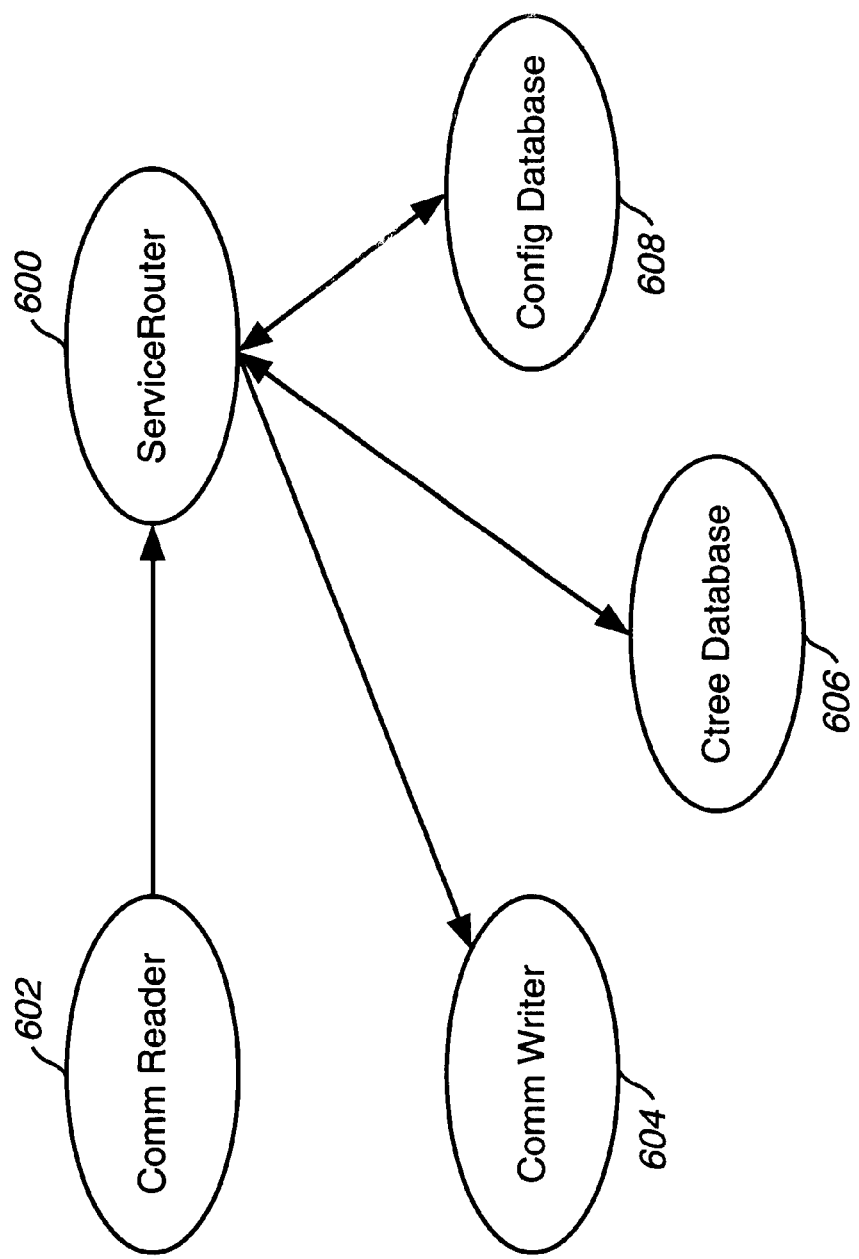
FIG. 6 illustrates the relationships between objects used in routing in the illustrative embodiment.

FIG. 6 depicts the relationship among objects used in the routing logic of the illustrative embodiment of the present invention. A service router object 600 has an associated object class. The service router object 600 instances oversee the routing of messages. Other objects and threads assist the service router object 600 and the routing of messages in the system. FIG. 6 depicts the routing paths among threads and objects. A Comm reader thread 602 object (i.e. reader thread 422 or reader thread 426) may route messages via the service router 600 to C-TREE database thread objects 606 and to the configuration database thread object 608. The C-TREE database thread objects 606 may route messages to a Comm writer thread object 604 (i.e. writer thread 424 and writer thread 428). The Comm writer thread objects 604 writes data out to external clients.

The service router object class 600 supports a number of methods. The registerService( ) method registers a service with the service router. Requests can be routed to a service only after the service has registered with the service router. An unregisterService( ) method unregisters any previously registered service so that request will no longer be routed to the service. A registerReplace( ) method replaces an object reference for a particular service with a supplied reference. A routeMessage( ) routes messages to a destination service queue.

Figure 7:
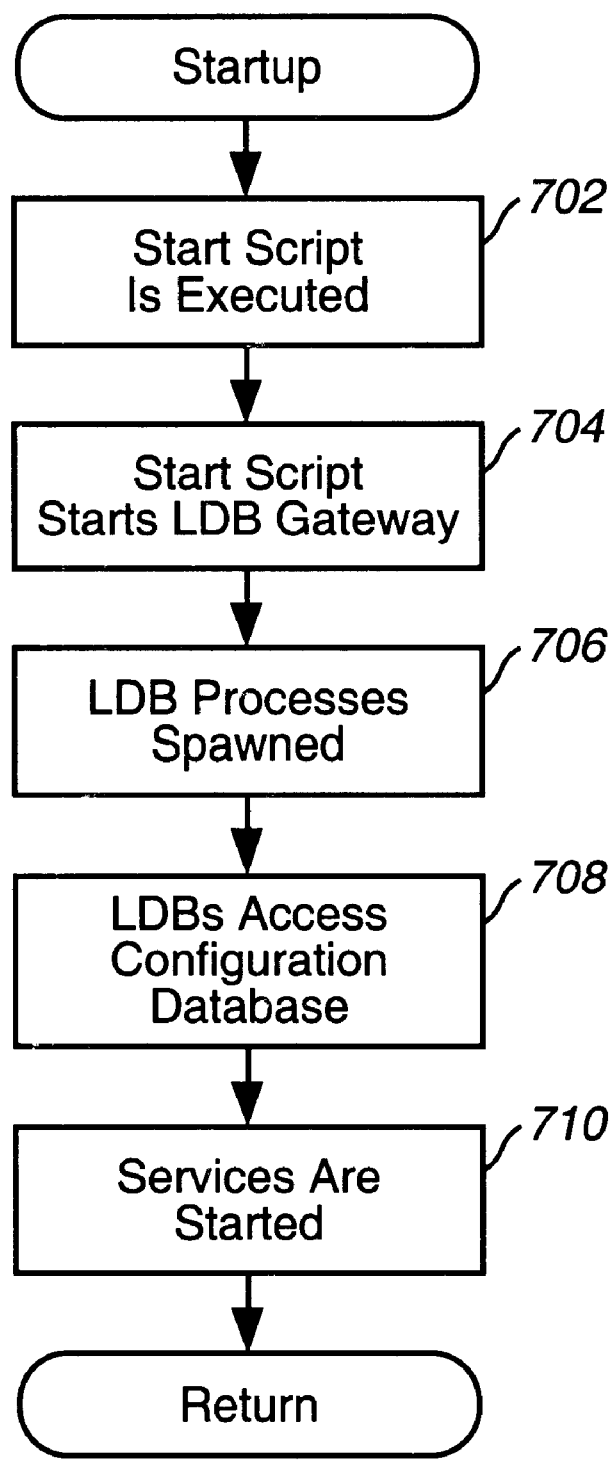
FIG. 7 is a flow chart illustrating the steps that are performed at startup of the LDB system.

FIG. 7 is a flow chart illustrating the steps that are performed during the startup. Initially, a start script is executed (Step 702). The start script starts the LDB GW 202 (Step 704) by sending it a start message via an interface 216. The LDB GW 202 then creates as many LDB processes 204 as are necessary to support the instances of the C-TREE databases 206 that are included in the system (Step 706 in FIG. 7). In the implementation where the LDB GW 202 is running, the LDB GW 202 then accesses a configuration database 208 to determine what services to start (Step 708 in FIG. 7). The identified services are started by the LDBs 204 (Step 710).

Figure 8:
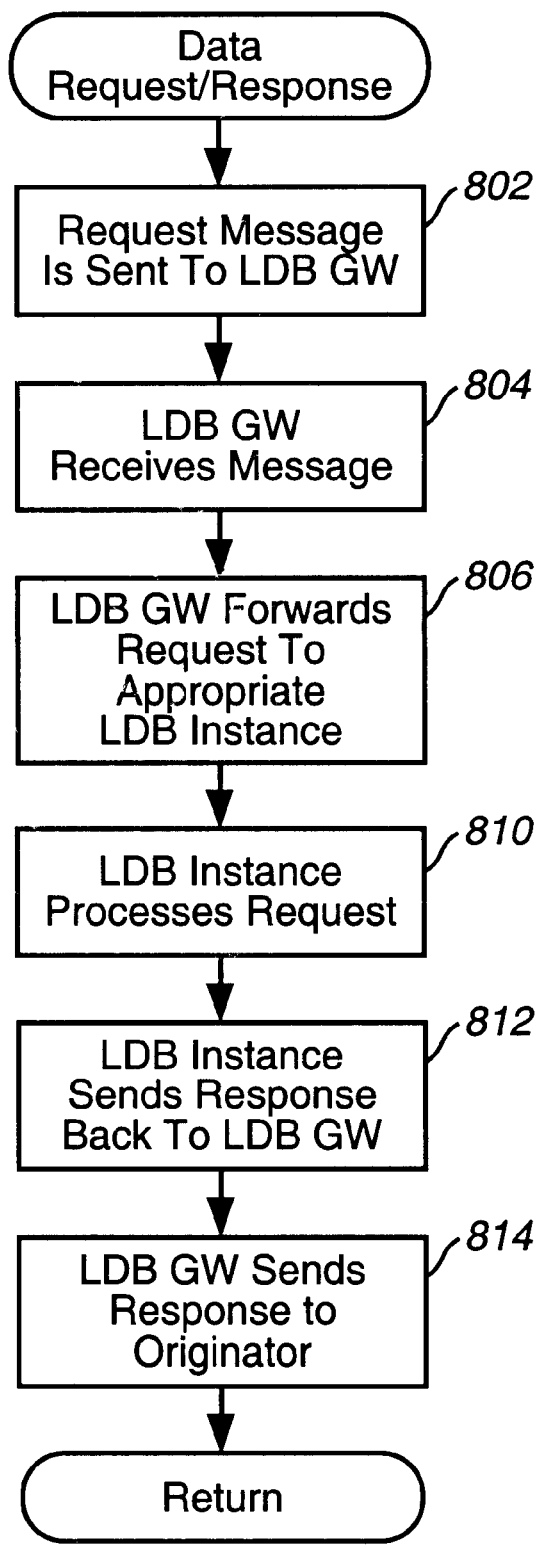
FIG. 8 is a flow chart illustrating the steps that are performed in a request/response sequence.
Figure 9:
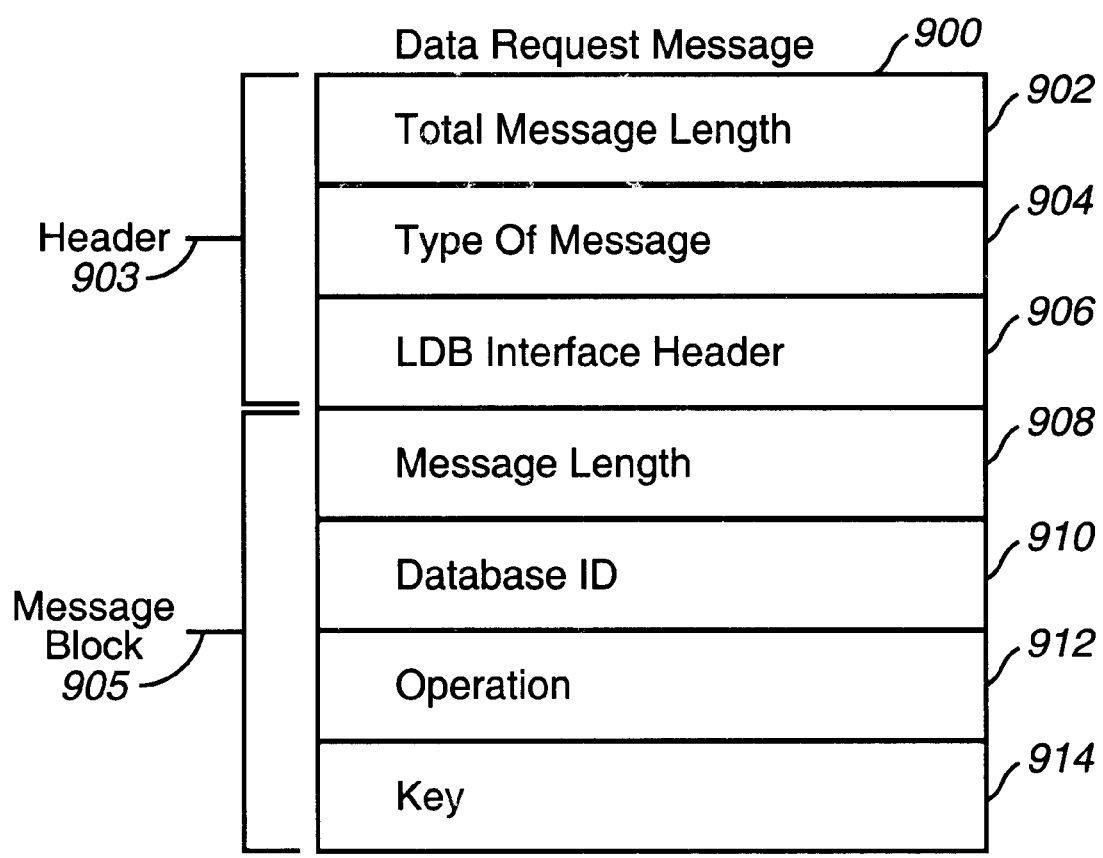
FIG. 9 illustrates the format of a data request message.

Clients communicate with the databases by sending request messages. In other words, when one of the application servers 106 needs an application program or related data, the application server sends a request. FIG. 8 is a flow chart that illustrates the data request/response sequence that is followed in the illustrative embodiment of the present invention. Initially, a request message is sent to an LDB GW 202 (step 802), which receives (step 804 in FIG. 8) and subsequently forwards the request to the appropriate LDB instance 204 (Step 806). FIG. 9 depicts the format of a data request message 900. The data request message 900 may divided into a header 903 and message block 905. The header 903 includes a total length field 902 that contains the total length of the message, including the header. The header 903 also includes a type of message field 904 that identifies the type of request. The header 903 additionally includes an LDB interface header field 906 that is used by a calling client to store response addressing such as a database I.D.

The message block portion 905 of the data request message 900 includes a message length field 908 that identifies the length of the message block. A database I.D. field 910 is provided to hold an identifier that uniquely identifies the database for which data is requested. An operation field 912 indicates the type of operation that is to be performed. The operation field may identify that the operation is a direct look-up or range look-up. For a direct look-up, a key is provided, an exact match of the key is attempted, and a single value (possibly multiple octets) is returned. For a range look-up, a key is provided, the key is compared with a range of values to determine if the key is within a valid range, and a single value (possibly multiple octets) is returned. A key field 914 specifies the key that is used to locate the data that is being requested.

Figure 10:
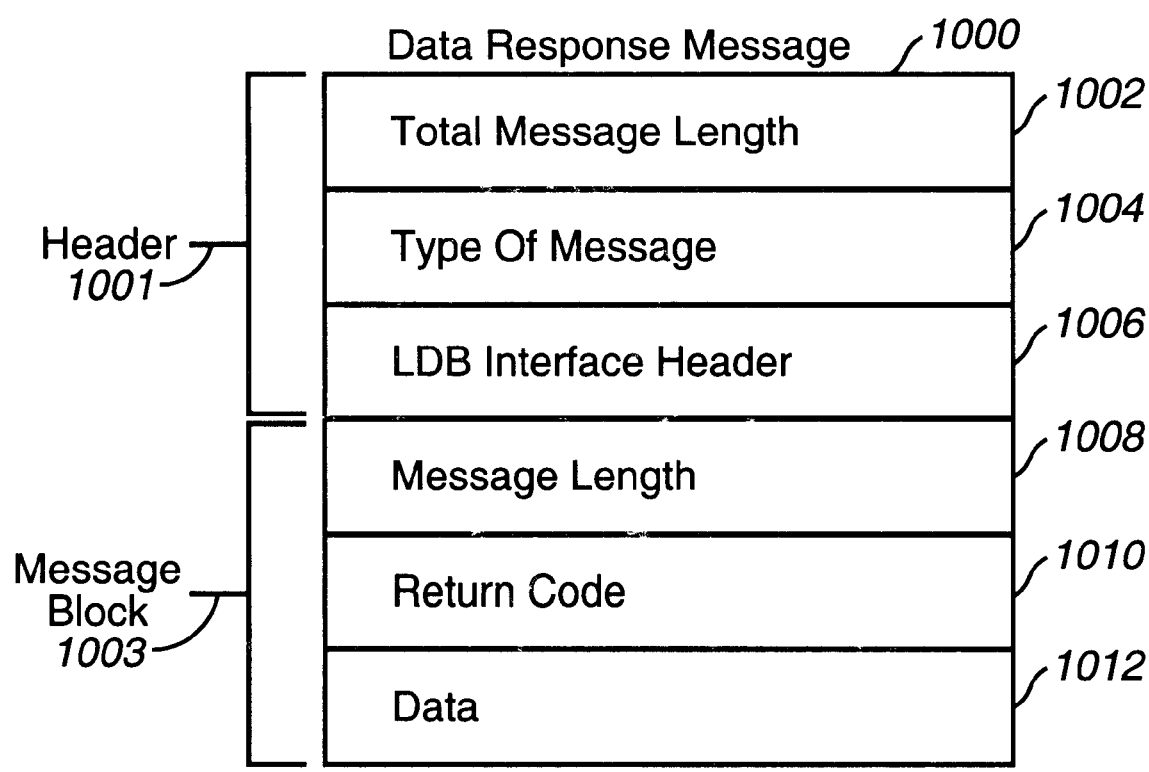
FIG. 10 illustrates the format of a data response message.

After the request message is sent to an LDB instance in Step 806 the LDB processes the message and attempts to retrieve the data that is requested (Step 810). The LDB then sends an appropriate response message to the LDB GW (step 812) which subsequently sends the response to the client (Step 814 in FIG. 8). FIG. 10 depicts the format of a data response message 1000. Like the data request message, the data response message 1000 may be divided into a header 1001 and a message block 1003. The header 1001 includes a total message length field 1002 that holds a value identifying the length of the total data response message. The type of message field 1004 is provided to hold a type identifier for the message. The LDB interface header field 906 is used by calling clients to store response addressing, such as a database I.D., and is copied to the similar field 1006 in the response message.

Figure 11:
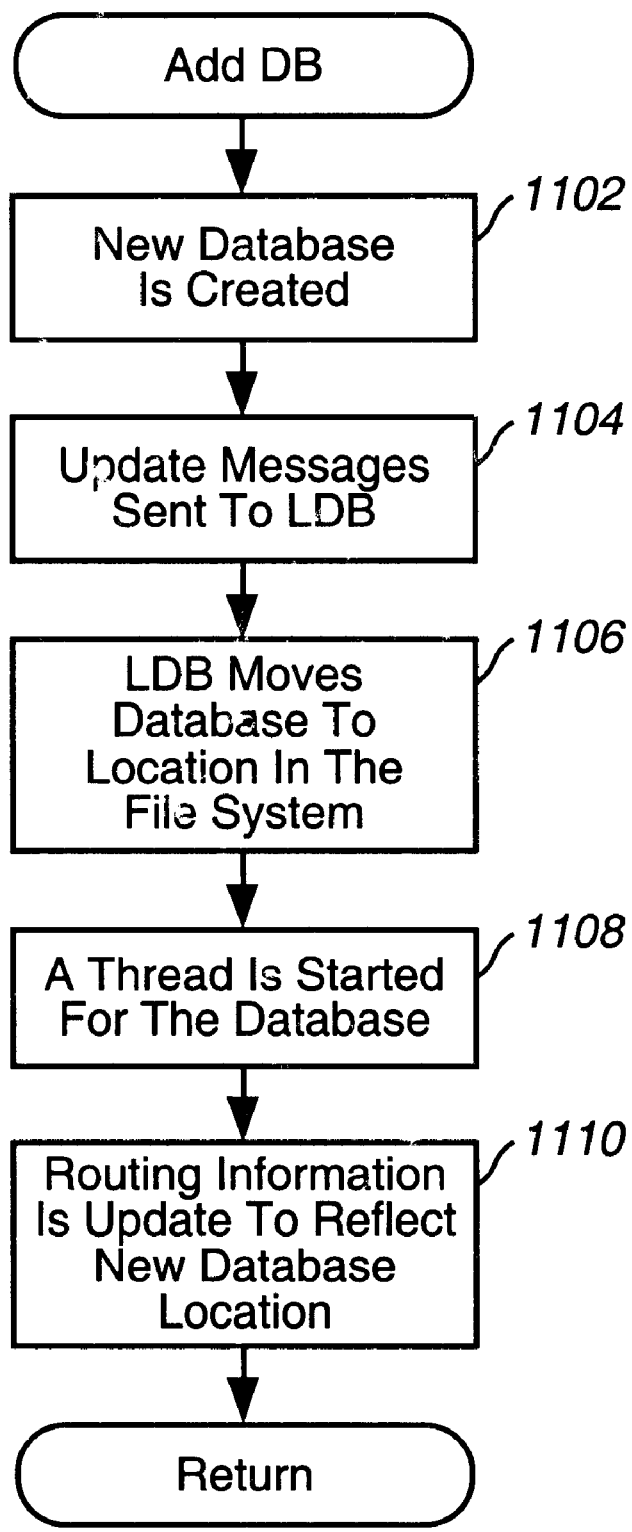
FIG. 11 is a flow chart illustrating the steps that are performed to add a database in the LDB system.

The message block 1003 includes a message length field 1008 that identifies the length of the message block 905. The message block 1003 also includes a return code field 1010 that indicates whether the data request was successful, whether there were any errors in processing the request and whether no data is being returned. A data field 1012 is provided in the message block to hold the data that is to be returned in response to data request. The data field 1012 is of variable length to accommodate the length of the returned data As was mentioned above, the illustrative embodiment of the present invention allows new databases to be dynamically added to the system without interrupting call processing. FIG. 11 is a flow chart illustrating the steps that are performed to add a new database to the system. Initially, a new database is created (Step 1102). This may be created, for example, by the provisioning system 136. An update message is then sent to the LDB instance 204 that is to manage the new database (Step 1104). The LDB instance 204 that receives the messages moves the new database to the appropriate location within the file system (Step 1106). A C-TREE thread 412 is then started for the database (Step 1108 in FIG. 11). This C-TREE thread 412 is responsible for interacting with the new database. Routing information is used by the routing logic and is then updated to reflect the new database location (Step 1110).

Figure 12:
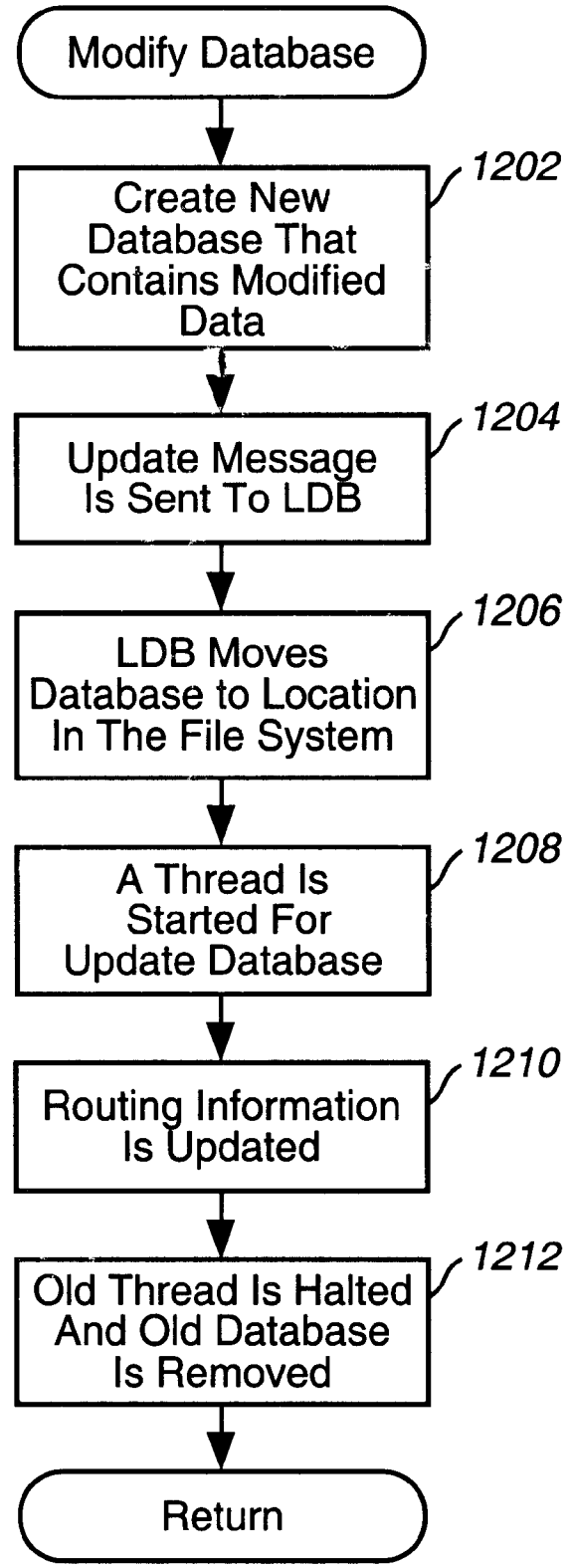
FIG. 12 is a flow chart illustrating the steps that are performed to modify a database in the LDB system.

The illustrative embodiment also supports modifications to the database as call processing continues. FIG. 12 is a flow chart illustrating the high-level steps that occur when a database is to be modified. Each time that a database is modified, a new database is created that includes the modified data (Step 1202). An update message is then sent to the appropriate LDB instance 204 (Step 1204). The LDB moves the database to the appropriate location within the file system (Step 1206), and a C-TREE thread is started for the updated database (Step 1208). The routing information is updated to reflect the location of the modified database (Step 1210). The old thread for the old database (i.e., the database prior to the modification) is halted and the old database is removed or marked as free for allocation (Step 1212).

Figure 13:
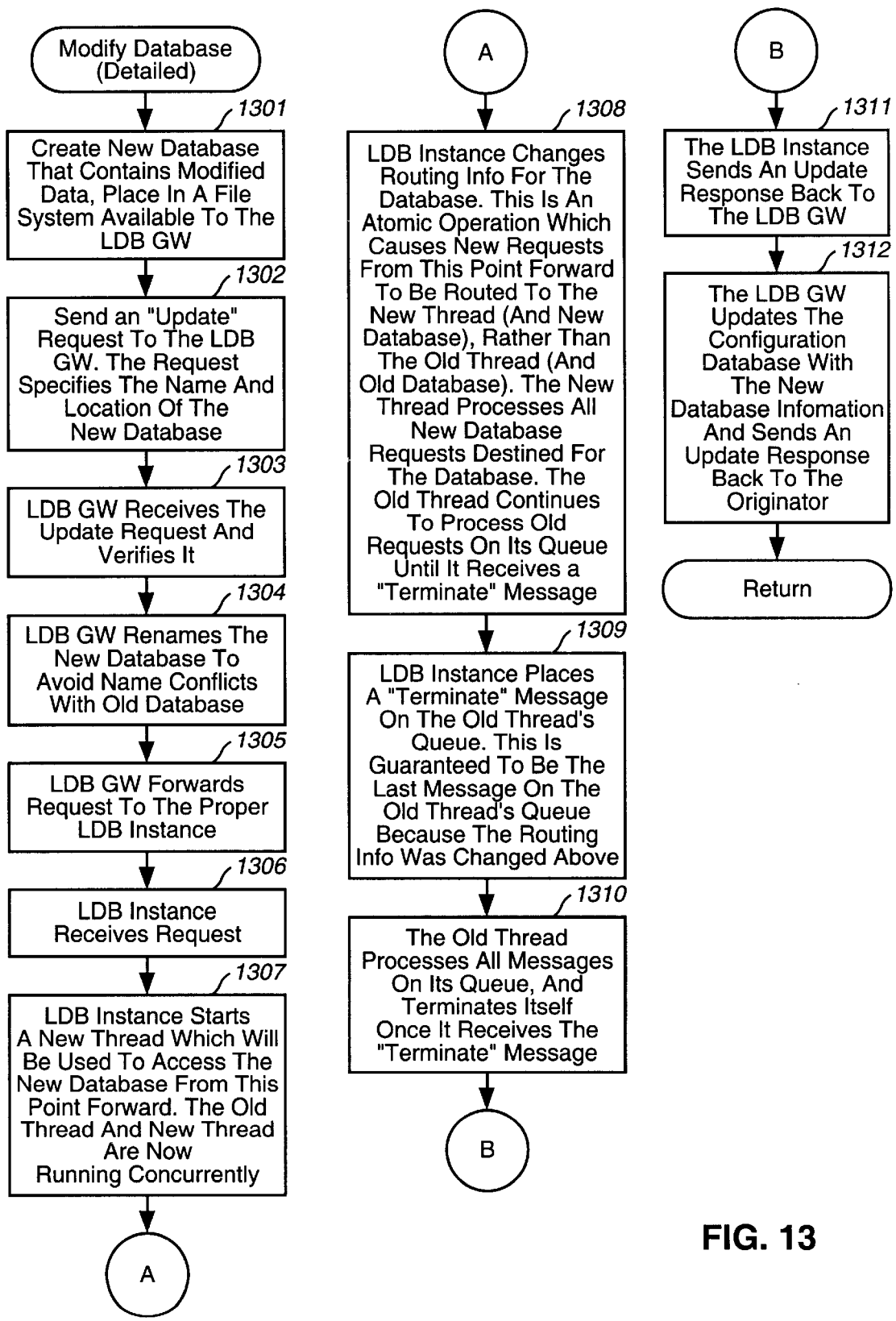
FIG. 13 is a flow chart illustrating the detailed steps that are performed to modify the database in the LDB system.

It should be noted that the old thread and old database are not removed until any queued requests destined for them are processed, thereby avoiding any data loss. FIG. 13 is a flow chart illustrating the detailed steps that occur when a database is to be modified. A new database is created and made available in the file system (step 1301). An Update request is sent to the LDB GW 202 (Step 1302). The LDB GW 202 verifies the request (Step 1303), renames the database to avoid name conflicts in the file system (Step 1304) and forwards the request to the appropriate LDB instance 204 (Step 1305). The LDB instance 204 receives the request (Step 1306) and starts a new thread (Step 1307). It then modifies the routing info for the database (Step 1308) atomically so that all new requests are routed to the new thread and no other requests are sent to the old thread. The LDB instance 204 then places a "terminate" message on the old thread's queue (Step 1309). The old thread continues to process messages on its queue until it receives the "terminate" message (Step 1310) at which time it terminates itself. Since the old thread cleans up its queue, it avoids data loss. Meanwhile, the new thread continues to run and process new requests. The LDB instance 204 sends up update response back to the LDB GW 202 (Step 1311) which updates the configuration database and sends an update response back to the originator (Step 1312).

While the present invention has been described with reference to an illustrative embodiment thereof, those skilled in the art will appreciate the various changes in form and in detail may be made without departing from the intended scope of the present invention as defined in the appended claims. For example, the present invention need not be practiced in an object-oriented environment. The NGSN configuration shown in FIG. 1 need not be used; rather other configurations may be used. Still further, the databases do not need to be C-TREE databases. In addition, the LDB instance (204, 312, 400) may operate stand-alone if desired, without requiring the use of the LDB GW (202, 300).

What is claimed is:

1. In a telecommunications system having an interactive voice response platform for providing interactive voice response services and a database system having multiple databases and a gateway including a thread manager for use by the interactive voice response platform, a method comprising the steps of:
   assigning a separate thread to each of the databases to perform operations on the databases;
   accessing a first of the databases to perform call processing with a first of the threads;
   modifying a second of the databases concurrently with the first thread accessing the first database without affecting the call processing; and
   managing the separate threads with the thread manager of the gateway.

2. The method of claim 1 wherein the step of modifying the second of the databases comprises modifying information included in the second of the databases.

3. The method of claim 1 wherein the interactive voice response platform is a voice response unit.

4. In a telecommunications system having an interactive voice response platform for providing interactive voice response services, a method comprising the steps of:
   providing a database system having multiple databases for use by the interactive voice response platform;
   assigning a separate thread to each of the databases to perform operations on the databases;
   accessing a first of the databases to perform call processing with a first of the threads; and
   modifying a second of the databases concurrently with the first thread accessing the first database without affecting the call processing,
   wherein the step of modifying the second of the databases comprises removing the second of the databases from use by the database system.

5. In a telecommunications system having an interactive voice response platform for providing interactive voice response services and a database system having multiple databases and a gateway including a thread manager for use by the interactive voice response platform, a method comprising the steps of:
   assigning a separate thread to each of the databases to perform operations on the databases;
   accessing a first of the databases with a first of the threads as a part of processing a call;
   adding a new database to the database system without interrupting the processing of the call; and
   managing the separate threads with the thread manager of the gateway.

6. The method of claim 5 wherein the interactive voice response platform is a voice response unit.

7. A database system, comprising:
   a plurality of databases holding information for use by an interactive voice response platform, said databases being logically grouped into subsets;
   an interface to the interactive voice response platform to facilitate communications between the database system and the interactive voice response platform;
   a separate thread assigned to each of the databases for performing operations on the database with which the thread is assigned;
   a separate process for each of the subsets of the databases for communicating with the thread and the interactive voice response platform via the interface; and
   a gateway including a thread manager for managing the separate threads.

8. The database system of claim 7 wherein the database system is an object-oriented database system.

9. The database system of claim 8 wherein each process is a separate instance of a same object class.

10. The database system of claim 7 wherein the gateway regulates access to the separate processes.

11. The database system of claim 10 wherein the gateway includes routing logic for routing messages to the separate processes.

12. The database system of claim 10 further comprising a configuration database holding configuration information for use by the gateway.

13. The database system of claim 7 further comprising a configuration database holding configuration information for use by the separate processes.

14. In a telecommunications network, a system comprising:
   an interactive voice response platform for providing interactive voice response services to callers, said platform running applications;
   a database system for use by the interactive voice response platform, including:
      a plurality of databases holding applications for use by the interactive voice response platform,
      a database management system for managing access to the databases,
      a separate thread assigned to each of the databases for performing operations on the databases, and
      a gateway including a thread manager for managing the separate threads.

15. The system of claim 14 wherein the interactive voice response platform is a voice response unit.

16. The system of claim 14 wherein the databases hold application's data that are accessed by the interactive voice response services to assist in processing calls.

17. In a telecommunications systems having an interactive voice response platform for providing interactive voice response services and a database system having multiple databases and a gateway including a thread manager for use by the interactive voice response platform, a computer-readable medium holding computer-executable instructions for performing a method, comprising the steps of:
   accessing a first of the databases with a first of a plurality of threads to assist in processing a call;
   modifying the databases of the database system concurrently with the first of the threads accessing the first database without affecting the call processing; and
   managing the plurality of threads with the thread manager of the gateway.

18. The computer readable medium of claim 17 wherein the step of modifying the second of the databases comprises modifying information included in the second of the databases.

19. The computer readable medium of claim 17 wherein the interactive voice response platform is a voice response unit.

20. In a telecommunications systems having an interactive voice response platform for providing interactive voice response services and a database system having multiple databases for use by the interactive voice response platform, a computer-readable medium holding computer-executable instructions for performing a method, comprising the steps of:
   accessing a first of the databases with a first of a plurality of threads to assist in processing a call; and modifying the databases of the database system concurrently with the first of the threads accessing the first database without affecting the call processing, wherein the step of modifying the second of the databases comprises removing the second of the databases from use by the database system.

21. A database system, comprising:

a plurality of databases holding information for use by an interactive voice response platform; and a separate thread assigned to each of the databases for performing operations on the databases, wherein a first of the databases is accessed to perform call processing with a first of the threads, and a second of the databases is modified, including removing the second of the databases from use by the database system, concurrently with the first thread accessing the first database without affecting the call processing.

22. In a telecommunications network, a system comprising:

a plurality of databases holding information for use by an interactive voice response platform; and a separate thread assigned to each of the databases for performing operations on the databases, wherein a first of the databases is accessed to perform call processing with a first of the threads, and a second of the databases is modified, including removing the second of the databases from use by the database system, concurrently with the first thread accessing the first database without affecting the call processing.

* * * * *